Nov. 2, 1965    H. MATTHEWS    3,215,944
SPIN WAVE PUMPED ELASTIC WAVE PARAMETRIC AMPLIFIER
Filed Jan. 30, 1964

$\omega_{cr} = \gamma H_i$

INVENTOR
H. MATTHEWS
BY
ATTORNEY

United States Patent Office 3,215,944
Patented Nov. 2, 1965

3,215,944
SPIN WAVE PUMPED ELASTIC WAVE PARAMETRIC AMPLIFIER
Herbert Matthews, Madison, N.J., assignor to Bell Telephone Laboratories, Incorporated, New York, N.Y., a corporation of New York
Filed Jan. 30, 1964, Ser. No. 341,301
5 Claims. (Cl. 330—4.6)

This invention relates to elastic wave transmission and more particularly to solid state elastic wave amplifiers of the parametric type.

The art is familiar with several forms of elastic wave solid state parametric amplifiers. All of these depend upon a time variation of the propagation velocity of a signal wave in an elastic medium. The velocity variation is produced at a frequency greater than the signal frequency, referred to in this art as the pump frequency. As a result, an interaction takes place in the elastic medium which forms a modulation product of their difference or "idler frequency." The idler is regenerative with respect to the signal frequency so that the signal wave grows at the expense of power taken from the pump. Several methods have been proposed for producing the required velocity variation. For example, it has been proposed to vary the stiffness in the elastic medium by introducing into the medium a high amplitude elastic wave at the pump frequency. An example of such an amplifier is shown in Patent 3,012,204 granted December 5, 1961 to K. Dransfeld et al. Alternatively it has been proposed to vary the amplitude of a magnetic bias applied to a magnetic elastic medium by superimposing a radio frequency magnetic field varying at the pump frequency upon and parallel to a steady magnetic bias. Examples of this type of interaction are suggested by R. L. Comstock and R. C. Le Craw in Physical Review Letters, vol 10, page 219 (1963).

In both these and other prior art forms a very large amount of pump power would be required to affect the stiffness, to significantly change the magnitude of magnetic bias or otherwise modify the medium in such a way as to vary the elastic wave velocity. For this reason, devices intended to operate upon these principles have low efficiencies or otherwise have not proven fully satisfactory.

It is therefore an object of the invention to amplify elastic waves by improved and efficient means.

In accordance with the present invention, it has been recognized that the elastic wave velocity in a magnetic material may be effectively controlled by the direction in which a magnetic field of a particular amplitude is applied relative to the direction of wave propagation. It has been found that this direction may be modulated at the desired pump frequency by a relatively small amount of pump power.

In particular, a steady magnetic field is applied to a member of single crystal ferromagnetic material having that field strength for which substantial coupling occurs between elastic waves and spin waves in the material. A radio frequency field varying at the frequency of the pump is applied at right angles to the steady field so that the resultant therebetween varies through an angle about the initial direction of the steady field. The signal is applied as an elastic wave propagating at a small angle to the initial direction of the steady field. Due to the interaction between elastic waves and the spin waves to which they couple, the velocity of the elastic wave is modulated by the modulated direction of the steady field.

These and other objects and features, the nature of the present invention, will appear more fully upon consideration of the specific illustrative embodiments shown in the accompanying drawings and described in detail in the following explanation of these drawings.

Figure 1:
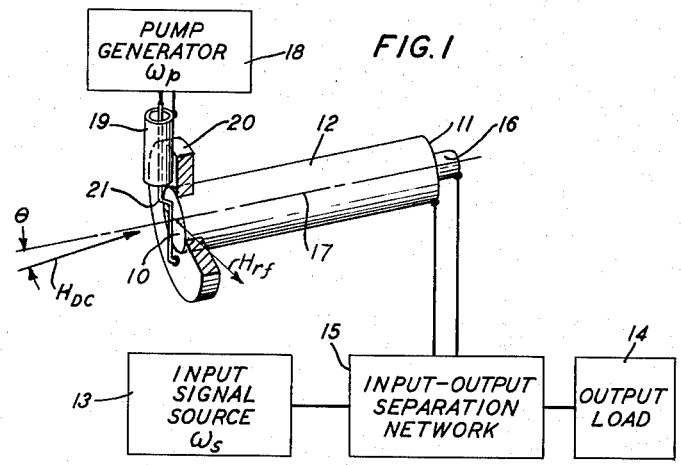
FIG. 1 is a showing, partly in schematic and partly in perspective, of a single-ended elastic wave parametric device in accordance with the invention.

Referring more particularly to FIG. 1, an illustrative embodiment of the invention is shown comprising a cylindrical rod 12 formed from a single crystal of nonconductive magnetic material of the type having substantial gyromagnetic properties at microwave frequencies, reasonably low magnetic losses, large magnetoelastic coupling constants and high acoustical Q. One of the materials most suitable for this purpose is yttrium iron garnet. While the orientation of the crystal axes in cylinder 12 does not appear to be critical, it is preferred that the cylindrical axis coincide with one of the crystal axes if only to facilitate mode purity of the elastic wave signal.

Means are provided at the right-hand end 11 of rod 12 for coupling an electrical input signal with an elastic wave in rod 12 and in turn for coupling an elastic wave from the rod to an electrical output load. As illustrated, the source of input signal $\omega_s$ is represented by 13 and the output load by 14. These circuits are coupled together by any suitable separation network 15 which is capable of discriminating between the input and output signals. For example, if the input is a source of pulses, network 15 can be a simple gating circuit which discriminates on the basis of time. On the other hand, network 15 may be one of any of the various forms of circulators which discriminate on the basis of direction of propagation. Network 15 is, in turn, coupled to a conventional piezo-electric ceramic or crystal transducer 16, bonded to the end face 11 of rod 12 by standard techniques so that when the transducer is excited by an alternating voltage such as a pulse of wave energy applied from network 15, a suitable mode of elastic vibration is introduced in rod 12 traveling parallel to axis 17 toward the opposite end 10 of the rod. Conversely, a returning elastic wave motion in the rod generates an electrical signal that is delivered by network 15 to load 14.

A direct-current biasing magnetic field is applied by means not illustrated in detail in a direction which makes a small acute angle $\theta$ with longitudinal axis 17 of rod 12 as illustrated schematically by the vector $H_{dc}$. The strength of this field and the importance of the angle $\theta$ will be defined in detail hereinafter with respect to FIG. 2.

Radio frequency energy at the pump frequency $\omega_p$ is supplied from generator 18 by any means capable of supporting a radio frequency magnetic field at substantially right angles to $H_{dc}$. As a specific example, coaxial line 19 having one end connected to generator 18 has its other end located adjacent to end face 10 with the outer conductor electrically and mechanically connected to a conducting ring 20 which surrounds rod 12 adjacent to end face 10. The center conductor 21 of coax 19 passes across face 10 and electrically terminates on the opposite side of ring 20. Ring 20 serves as a ground plane for the radio frequency fields supported between conductor 21 and ring 20 by means of which a radio frequency magnetic field, schematically represented by a vector $h_{rf}$, is developed in the plane of end 10 substantially normal to the steady field $H_{dc}$.

In accordance with a first specific embodiment of the invention designed to operate with a 700 mc./sec. signal, an yttrium iron garnet crystal cylinder 1.06 centimeters long, 0.53 centimeter in diameter, and having its cylindrical axis along the [100] crystal axis, was employed. An external steady field of approximately 520 oersteds was applied at an angle of less than 20° and more than 5° to the cylinder axis. The pump signal had a frequency substantially twice the signal frequency, or 1400 mc./sec., and had sufficient power to produce between 1 and 100 oersteds at the cylinder end face. Over a frequency range of from 500 to 800 mc./sec. an electronic gain of at least 10 decibels and as much as 30 decibels was produced which appeared to be proportional to the strength of the pumping field. Operation was not dependent upon critical adjustment of either the direction or magnitude of the steady field but upon a proper combination of both.

While it is not intended to limit the scope of the present invention by the theory now to be presented, this theory is believed to be accurate and consistent with observable facts and accepted scientific principles. This theory may be demonstrated more readily by reference to FIG. 2 which will also serve to define the conditions under which the present invention operates.

Figure 2:
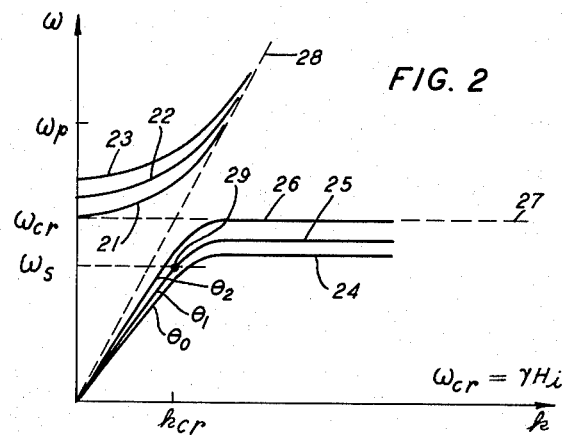
FIG. 2 is a plot of the typical spin wave-elastic wave dispersion in a nonconductive ferromagnetic solid and is given for the purpose of defining the conditions under which the present invention operates.

FIG. 2 shows a typical dispersion characteristic for spin waves and elastic waves including the effect of magnetoelastic interaction. A full development of this characteristic along with the equations which underlie it may be found in a paper entitled, "Generation of Phonons in High-Power Ferromagnetic Resonance Experiments" by Ernst Schlomann in Journal of Applied Physics, vol. 3, page 1647, September 1960. Particularly, FIG. 2 shows the relation between angular frequency $\omega$ and the wave number $k$ ($k=2\pi/\lambda$, where $\lambda$ is the wavelength). At low values of $k$ curves 21, 22 and 23 represent waves that are essentially purely magnetic and curves 24, 25 and 26 represent those that are essentially purely elastic. As $k$ is increased, a region is reached in which the spin and elastic waves couple as magnetoelastic waves. The art has designated this region as the crossover region. The crossover frequency $\omega_{cr}$ is a function of the biasing field $H_i$ according to the relationship $\omega_{cr}=\gamma H_i$ where $\gamma$ is the gyromagnetic ratio of the particular material under consideration and $H_i$ is the internal field after accounting for demagnetizing factors. The dotted curves 27 and 28 show the dispersion relation for spin waves and elastic waves, respectively, when magnetoelastic interaction is neglected. With substantial coupling between spin and elastic waves solid curve 24 represents the elastic wave branch when the angle $\theta$ between the direction of elastic wave propagation and the biasing field is $\theta_0$ or zero. For propagation angles different from zero, the elastic wave branch may be represented for instance by curves 25 and 26 for the angles $\theta_1$ and $\theta_2$.

Since the ordinate of FIG. 2 is a function of frequency and the abscissa thereof a function of wavelength, the velocity of a wave of frequency $\omega$ propagating at angle $\theta$ is given by the slope of the straight line drawn through the origin to the point of intersection of the curve for angle $\theta$ and the ordinate for frequency $\omega$. Thus, the figure illustrates how the velocity of an elastic wave of a given frequency differs according to the angle of propagation with respect to the internal magnetic field. The figure further shows that the velocities of elastic waves whose frequencies are close to the crossover frequency are more strongly dependent on the propagation angle than those whose frequencies are far from the crossover frequency. In accordance with the invention modulation of the velocity of an elastic wave is obtained by altering the direction of the internal magnetic field, the direction of elastic wave propagation being fixed by the method of launching the waves into the material. Since elastic waves whose frequencies are close to the crossover frequency are more strongly attenuated than those far from the crossover frequency, a biasing field $H_i$ is selected that is greater than $\omega_s/\gamma$ to avoid excessive losses but is small enough that the frequency $\omega_s$ of the elastic wave that is to be amplified is sufficiently close to $\omega_{cr}$ that a large velocity change is produced by modulation of the angle of propagation. Also in accordance with the invention, the field is initially applied at the angle $\theta$, so that as the angle is modulated at the frequency $\omega_p$ the velocity of the elastic wave will vary between its extreme values at the frequency $\omega_p$. If the initial angle were zero, the velocity would vary at $2\omega_p$ since the velocity depends only on the magnitude of the angle and not on its sign. Thus, a typical mode of operation is represented by point 29 on curve 25. The frequency of the pump is selected to be greater than and in the mode of operation known as degenerate is selected to be twice the signal frequency to satisfy the usual parametric amplifier conditions.

It should be understood that the value of biasing field referred to above as $H_i$ is the internal magnetic field existing within the ferromagnetic body. The strength of the actual applied field $H_{dc}$ external to the body required to produce a given $H_i$ is, of course, larger than $H_i$ by an amount determined by the demagnetizing factors of the body which factors in turn depend upon the shape of the body. For example, in a right circular cylindrical rod biased directly along its cylindrical axis, the demagnetizing factors are greatest at the end faces and decrease to small values in a center region of the rod. Thus, a given value $H_i$ only exists in one very limited region along the axis of the rod. For a bias along the cylindrical axis, this region may be readily identified by the use of well known calculations of demagnetizing field. However, when the field is applied at an angle to the cylindrical axis according to the invention, these calculations become very complicated. While the strength of the external field may readily be adjusted empirically, certain simplifications can be made by employing a body having symmetry in all directions, such as a predominantly spheroid or ovoid body, instead of a rod for body 12.

It should also be noted that FIG. 2 applies only to elastic waves having a direction of particle motion predominantly normal to the direction of the biasing field, i.e., the condition which would exist when transducer 16 generates transverse elastic waves. This mode of operation has been chosen for explanatory purposes for convenience only, since the principles of the invention apply as well to longitudinal elastic waves.

While it is contemplated that the principles of the present invention may eventually be used to amplify electrical signals, it should be noted that this is presently impractical because of the low efficiency of the transducers which convert between electrical and elastic energy. The values of electronic gain set forth above exclude these acoustic losses in accordance with usual practice. Therefore, the present invention finds its immediate usefulness in a system where elastic energy is already present for other reasons. Certain of these are described in my United States Patent 3,121,849, granted February 18, 1963. Another is the familiar use of an ultrasonic delay line to delay the time of an ultrasonic signal or to modify the time versus frequency relationships of components within the signal. This use is illustrated in FIG. 1 when it is assumed that the function of the major portion of rod 12 is that of a delay line. Thus, the length of rod 12 as well as its other dimensions are selected to modify in some desired way the ultrasonic energy applied to it by transducer 16. The parametric gain introduced at its extreme left-hand end advantageously compensates for losses introduced by other parts of the system. In the absence of these or other reasons which determine the size of rod 12, the bulk of the ferromagnetic material required only for amplification is very small. In particular, a tiny body of magnetic material in the vicinity of conductor 21 that is suitably excited by elastic energy is all that is required.

It should be noted that other means for supporting the radio frequency pump field and for applying it to the magnetic material may be substituted for conductor 21 and its associated ring 20. For example, the end of rod 12 may be inserted into an appropriately excited microwave cavity at a point of high magnetic field intensity.

Figure 3:
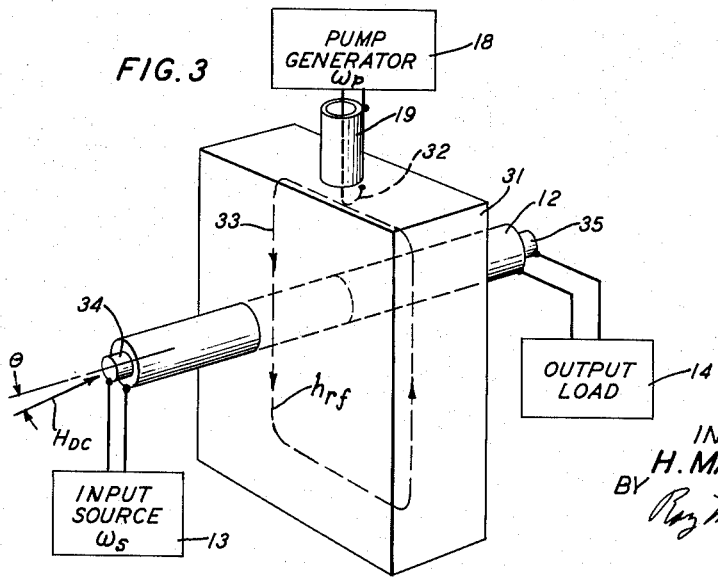
FIG. 3 is a schematic showing of an alternative construction for the embodiment of FIG. 1.

Also, it should be noted that the structure can be operated with separate input and output transducers at opposite ends of the ultrasonic path by applying the pump field to a center region of the path. In FIG. 3 both of these modifications are illustrated. Thus, a conductive bounded microwave cavity 31 of suitable shape and dimensions to be resonant at the pump frequency is excited by loop 32 connected to coax 19. Rod 12 extends through cavity 31 with a center portion of its longitudinal axis perpendicular to the magnetic field components 33 of the particular resonant mode. These components therefore correspond to $h_{rf}$ described above. Input transducer 34, connected to signal source 13, launches an ultrasonic vibration traveling to the right along rod 12, through cavity 31, to output transducer 35 which is in turn connected to load 14. At some point within cavity 31 the externally applied field $H_{dc}$ and the radio frequency field $h_{rf}$ within the cavity will have the relative values and directions specified above, and the parametric interaction defined will take place. At this point power will be transferred from the pump into the signal which then continues its course along rod 12 to transducer 35.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. An elastic wave amplifier comprising a member of nonconductive magnetic material, means for launching an elastic wave signal frequency in said member to propagate therein in a given direction, means for applying a steady magnetic field to said member at an angle of between 5 and 20 degrees to said given direction, and means for applying a radio frequency magnetic field alternating at substantially twice said signal frequency to said member at substantially right angles to said steady field.

2. An elastic wave amplifier comprising a member of nonconductive ferromagnetic material, means for launching an elastic wave of signal frequency $\omega_s$ in said member to propagate therein in a given direction, means for applying to a portion of said member a radio frequency magnetic field alternating at a frequency $\omega_p$ and having a substantial component at right angles to said direction in said portion, and means for applying a steady magnetic field to said member at an acute angle to said given direction, said steady field having a strength which biases said portion for maximum coupling between elastic waves and spin waves in said material at a frequency lying between $\omega_s$ and $\omega_p$.

3. An elastic wave amplifier comprising a member of nonconductive ferromagnetic material having a gyromagnetic ratio $\gamma$, means for launching an elastic wave of signal frequency $\omega_s$ in said member to propagate therein in a given direction, means for applying to a portion of said member a radio frequency magnetic field alternating at substantially twice $\omega_s$ and having a substantial component at right angles to said direction in said portion, and means for applying a steady magnetic field to said member at an acute angle to said given direction, said steady field having a strength which biases said portion with an internal field strength that is greater than $\omega_s/\gamma$ by an amount small enough that substantial coupling exists between elastic waves and spin waves in said material.

4. In combination, a body of yttrium iron garnet, an electromechanical transducer coupled to one portion of said body for launching an elastic wave of signal frequency $\omega_s$ propagating along a given axis through said body, means including a circuit for supporting electromagnetic wave energy adjacent to another portion of said body for applying a radio frequency magnetic field alternating at a frequency substantially greater than said signal frequency in a direction substantially normal to said axis, and means for applying a steady magnetic field to said body which produces in a region of said body between said portions a magnetic field intensity that is approximately $\gamma\omega_s$ where $\gamma$ is the gyromagnetic ratio of said garnet.

5. In combination, an elongated rod of yttrium iron garnet, an electromechanical transducer coupled to one end of said rod for launching an elastic wave of signal frequency propogating along the axis of said rod, means including a circuit for supporting electromagnetic wave energy adjacent to the other end of said rod for applying a radio frequency magnetic field alternating at a frequency substantially greater than said signal frequency in a direction substantially normal to said axis, and means for applying a steady magnetic field to said member at an angle of between 5 and 20 degrees to said given direction.

No references cited.

ROY LAKE, *Primary Examiner.*